United States Patent
Shah et al.

(10) Patent No.: US 8,037,700 B2
(45) Date of Patent: Oct. 18, 2011

(54) AIR CONDITIONING SYSTEM FOR LOW AMBIENT COOLING

(75) Inventors: Rajendra K. Shah, Indianapolis, IN (US); Eugene L. Mills, Avon, IN (US); Lynn A. Turner, Avon, IN (US)

(73) Assignee: Carrier Corporation, Farmington, CT (US)

( * ) Notice: Subject to any disclaimer, the term of this patent is extended or adjusted under 35 U.S.C. 154(b) by 482 days.

(21) Appl. No.: 12/223,089

(22) PCT Filed: Jan. 22, 2007

(86) PCT No.: PCT/US2007/001603
§ 371 (c)(1),
(2), (4) Date: Jul. 22, 2008

(87) PCT Pub. No.: WO2007/087248
PCT Pub. Date: Aug. 2, 2007

(65) Prior Publication Data
US 2010/0223941 A1    Sep. 9, 2010

(51) Int. Cl.
*F25B 49/00*     (2006.01)
*F25D 17/00*     (2006.01)
(52) U.S. Cl. .............. 62/181; 62/183; 62/228.3; 62/229
(58) Field of Classification Search ............ 62/157, 62/181, 183, 228.3, 229, DIG. 17
See application file for complete search history.

(56) References Cited

U.S. PATENT DOCUMENTS

| 4,941,325 | A | * | 7/1990 | Nuding | 62/158 |
| 5,291,745 | A |   | 3/1994 | Hanson | 62/89 |
| 6,463,747 | B1 |  | 10/2002 | Temple | 62/129 |
| 6,606,872 | B1 | * | 8/2003 | Smith | 62/175 |

FOREIGN PATENT DOCUMENTS
CN         1693797 A     11/2005

OTHER PUBLICATIONS

International Search Report issued Nov. 19, 2007 for the corresponding international application PCT/US2007/001603.

\* cited by examiner

*Primary Examiner* — Marc E Norman
(74) *Attorney, Agent, or Firm* — Cantor Colburn LLP (57) ABSTRACT

An air conditioning system that comprises a controller that is in electrical communication with a compressor, a condenser fan, a temperature sensor that measures the temperature of the ambient air, a temperature sensor that measures the temperature of a condenser coil of the air conditioning system, and a low pressure switch (LPS) that measure the pressure of a refrigerant disposed within the air conditioning system. An algorithm resident on the controller controls the controller to enter a low ambient cooling mode when the temperature of the ambient air is less than a set temperature. The algorithm further controls the controller so that a minimum and/or maximum cycling frequency is imposed on the condenser fan. The algorithm further controls the controller so that the controller does not respond to an LPS trip during the early part of a cooling cycle under low outdoor temperature conditions, which might not accurately indicate a system fault, but still shuts down the compressor in response to an LPS trip under conditions that truly indicate a system fault.

19 Claims, 4 Drawing Sheets

AIR CONDITIONING SYSTEM FOR LOW AMBIENT COOLING

BACKGROUND OF THE DISCLOSURE

1. Field of the Disclosure

The present disclosure relates to an air conditioning system. In particular, the present disclosure relates to an air conditioning system that performs at low ambient temperatures.

2. Description of the Related Art

Air conditioning systems are generally operated to condition (e.g., heat, cool, and/or dehumidify) air in a predetermined space such as, but not limited to, a house, a building, a car, a refrigerator, a freezer, and others.

Many air conditioning systems are not designed to operate in the cooling mode when the outdoor temperature is below a certain temperature, such as about 55° Fahrenheit. In general, as the air conditioner operates in the cooling mode below this temperature, the temperature and pressure of the refrigerant flowing through its outdoor heat exchanger coil falls below desirable levels. Performance variables of the air conditioning system, such as the cooling capacity and the efficiency, start dropping off. The reliability of the air conditioning system can also decrease as problems, such as liquid refrigerant flooding the compressor or the indoor heat exchanger coil freezing, can occur.

However, many applications of air conditioning systems are installed in settings where there may be a need for cooling even when the weather outside is below the predetermined set point. An example of such an application is a computer room inside a commercial building, where the equipment generates a lot of heat and yet requires moderately cool temperatures to operate properly and reliably. Thus, there is a desire for air conditioning systems that are configured to maintain efficient operation in a cooling mode at ambient outside temperatures below the predetermined set point.

In order to extend the operating range of a residential air conditioning system to lower outdoor temperatures, several low ambient cooling kits are currently available. While there are many variations of these kits, there are two main exemplary embodiments. The general object of these kits is to maintain either the temperature or the pressure of the air conditioning refrigerant fluid in the outdoor heat exchanger coil of the air conditioner within desirable limits, by either cycling or varying the speed of the outdoor fan motor that blows air over the outdoor heat exchanger coil.

One embodiment of these kits comprises a temperature sensor and electronic circuits used to vary the speed of a standard AC fan motor, which blows ambient air over the outdoor heat exchanger coil. The temperature sensor is installed at an appropriate location on the coil to sense liquid refrigerant temperature. The electronic circuit typically "chops" or cuts off parts of the AC sinusoidal voltage applied to the fan motor to vary its speed in relationship with the sensed refrigerant temperature. The fan motor speed is reduced more and more as the sensed temperature falls. The slower fan speed reduces the quantity of heat lost by the refrigerant in the coil to the outdoor air. If the refrigerant temperature increases, the fan speeds up, causing a greater rate of heat exchange from the refrigerant to the ambient air. This overall mechanism enables the regulation of refrigerant temperature within a relatively narrow desirable range over a wide range of outdoor air temperatures.

This kit, however, is expensive and requires a ball-bearing fan motor that can operate reliably over a wide speed range. Also, the electronic "chopping" method of varying the speed of the motor causes undesirable harmonics in the AC power line.

In another embodiment of the low ambient kits of the prior art, a pressure switch is installed at the appropriate location in the outdoor heat exchanger coil. This pressure switch turns on and off at predetermined refrigerant pressure levels. It is electrically connected in series with the outdoor fan motor. When the refrigerant pressure falls below one predetermined pressure level, the pressure switch turns the fan motor off. When the refrigerant pressure increases above a second predetermined level, the switch turns the fan motor back on. In this manner the fan motor is cycled to regulate refrigerant pressure.

This embodiment, while simpler, requires the installer to break into the refrigerant system to install the pressure switch, which may cause refrigerant leaks. It also typically results in rapid fan cycling, causing stresses on various components of the system. Furthermore, cooling capacity and efficiency drop off significantly at lower outdoor temperatures.

Both of these embodiments require several additional items to be installed in the air conditioning system. Air conditioning systems usually include a low pressure switch (LPS), which acts as a protection device and shuts the system down when the refrigerant pressure falls to a very low level, which usually indicates a loss of refrigerant. However, the LPS may falsely trip, even when refrigerant levels are normal, and cause nuisance shutdowns in the beginning of low ambient cooling cycles. For this reason, the low ambient kits require an LPS bypass timer switch, which bypasses the LPS, allowing continued operation, for a fixed period, typically 3 minutes, at the beginning of each cycle. After this fixed period, refrigerant pressures normally build up to levels that reset the LPS and the bypass is not needed. If the LPS remains tripped beyond this fixed period, this clearly indicates a system fault and the consequent shutdown is justified.

Low ambient cooling operation can also result in the freezing of the indoor heat exchanger coil in the air conditioning system. For this reason a freeze thermostat is required to be installed on the indoor coil. This is simply a temperature switch that senses a freezing temperature on the coil and shuts the air conditioner down.

Recently, dual stage air conditioning systems are becoming more popular. In such systems, the first stage delivers a significantly lower cooling capacity by reducing the refrigerant flow rate produced by the compressor, while the second stage delivers the full cooling capacity. The first stage is typically significantly more energy efficient, while its lower capacity is sufficient to match the cooling demand during milder weather conditions. The less efficient second stage is available to deal with the higher demand when the weather is hotter.

It is much more difficult to apply the prior art kits to the newer and more energy efficient dual stage air conditioners. This is because the two stages have two different refrigerant flow rates, and therefore two different desired refrigerant temperature and/or pressure ranges, one for each stage. The above kits can be optimized for only one such range, for one of the stages, with performance or reliability degradation occurring in the other stage. It is also complex and impractical to "double up" the kits and install to of them on a dual stage air conditioning system. For this reason, the prior art low ambient cooling kits have not been found acceptable for dual stage systems.

Accordingly, there is a continuing need for air conditioning systems that can cool efficiently at low ambient temperatures and overcome one or more of the aforementioned and other disadvantages of currently available air conditioning systems.

SUMMARY OF THE DISCLOSURE

The present disclosure provides an air conditioning system that comprises a temperature sensor, where the first temperature sensor measures a temperature of ambient air outside the air conditioning system, and a controller, where the temperature sensor is in electrical communication with the controller. An algorithm resident on the controller controls the controller to enter a low ambient cooling mode when the temperature of the ambient air is less than a set temperature. In one embodiment, the set temperature can be 55 degrees Fahrenheit.

The air conditioning system can further comprise refrigeration circuit that comprises a compressor, a condenser, a condenser fan, a second temperature sensor that measures the temperature of the condenser, and an LPS that measures the pressure of a refrigerant disposed within the refrigeration circuit. The compressor, condenser fan, second temperature sensor, and LPS are also all in electrical communication with the controller. The first temperature sensor, second temperature sensor, and LPS provide their respective sensed values to the controller.

The algorithm controls the controller so that the condenser fan is cycled on and off based on the sensed outdoor air temperature, the sensed outdoor coil temperature and the current operating stage of the compressor per a predetermined fan cycling schedule. The algorithm also controls the controller so that a minimum and/or maximum cycling frequency is imposed on the condenser fan.

The algorithm further controls the controller so that the controller does not respond to a LPS trip during the early part of a cooling cycle under low outdoor temperature conditions, which might not accurately indicate a system fault, but still shuts down the compressor in response to an LPS trip under conditions that truly indicate a system fault.

DETAILED DESCRIPTION OF THE DISCLOSURE

The present disclosure provides an integrated air conditioning system capable of operating in a cooling mode over a full range of outdoor ambient temperatures that can exist in most climatic zones, including in particular temperatures below about 55° F. Advantageously, the air conditioning system of the present disclosure achieves optimized performance and reliability over this range of outdoor ambient temperatures, and requires minimal or no field installed add-on components.

Figure 1:
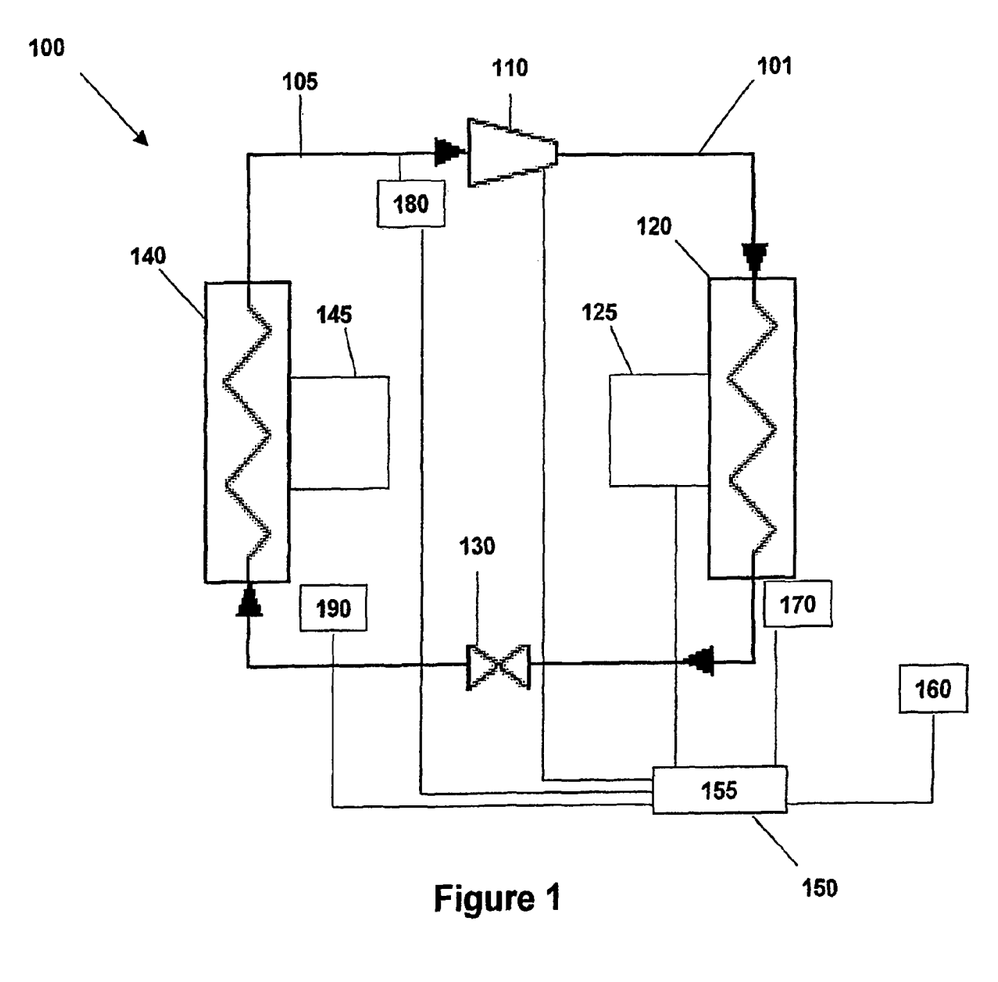
FIG. 1 is a schematic diagram of an exemplary embodiment of an air conditioning system according to the present disclosure.

Referring to FIG. 1, a schematic diagram of the air conditioning system ("system") 100 of the present disclosure is shown. System 100 has a refrigerant line 105, a compressor 110, a condenser coil 120, a condenser or outdoor fan 125, an expansion device 130, an evaporator coil 140, and an evaporator or indoor fan 145. In system 100, line 105, compressor 110, condenser coil 120, expansion device 130, and evaporator coil 140 define a refrigeration circuit 101, having a refrigerant flowing therethrough in the direction of the arrows shown in FIG. 1.

System 100 further comprises a controller 150 having a control algorithm 155 resident thereon. Controller 150 is in electrical communication with, and controls the system 100. For example, controller 150 controls the operation of at least compressor 110 and outdoor fan (ODF) 125. System 100 further comprises an outdoor air temperature (OAT) sensor 160, an outdoor heat exchanger coil temperature (OCT) sensor 170, and a low pressure switch (LPS) 180, which are also in electrical communication with the controller 150, and will be discussed in further detail below. In one embodiment of system 100, OAT sensor 160 and OCT sensor 170 are thermistors. The controller 150 cycles the ODF 125 on and off, based on the OAT as determined by the OAT sensor 160, the OCT as determined by the OCT sensor 170, and the current operating stage of compressor 110, according to the algorithm 155 discussed below. In this manner, controller 150 imposes a minimum and/or a maximum cycling frequency on ODF 125.

The term "controller" is used herein to refer to any method or system for controlling and should be understood to encompass microprocessors, microcontrollers, programmable digital signal processors, integrated circuits, computer software, computer hardware, electrical circuits, application specific integrated circuits, programmable logic devices, programmable gate arrays, programmable array logic, personal computers, chips, and any other combination of discrete analog, digital, or programmable components, or other devices capable of providing processing functions.

LPS 180 is connected to the system 100 in such a way so that it can detect a drop in refrigerant pressure within the system 100 below an acceptable level, which indicates a loss of refrigerant within the system. LPS 180 can send a signal to an external device (not shown), such as an alarm, that can indicate a fault.

In the present disclosure, LPS 180 is connected to the refrigerant line 105 at a point in advance of the compressor 110, and sends such a fault signal to controller 150. Furthermore, in the present disclosure, algorithm 155 is configured so that controller 150 does not respond to a signal from LPS 180 during the early part of a cooling cycle under low outdoor temperature conditions, which may not accurately indicate a true system fault.

Advantageously, algorithm 155 is configured so that controller 150 still shuts down and protects the compressor 110 in response to a signal from LPS 180 under conditions that truly indicate a system fault, while ignoring signals from LPS 180 that do not accurately indicate such a fault. This process is discussed in further detail below. Moreover, algorithm 155 is configured to use only those components on typical air conditioning systems and, thus, no special add-on components, additional wiring, or intrusion into the refrigeration system that could result in damage from miswiring or contamination is required. System 100 also does not require any additional service from a technician once the system is installed, to provide for low ambient cooling operation. As will be discussed in further detail below, the system 100 of the present disclosure provides the benefits of low ambient cooling, without the extra costs and disadvantages associated with the systems of the prior art.

In one embodiment, system 100 can be a dual stage system, where controller 150 is configured to operate the system in a first, or "high" stage, and a second or "low" stage. In the low stage of a dual stage system, system 100 delivers a lower cooling capacity by reducing the refrigerant flow rate produced by the compressor 110. In the high stage, system 100 delivers the full cooling capacity of the system. The low stage is typically significantly more energy efficient, while its lower capacity is sufficient to match the cooling demand during milder weather conditions or when the load on system 100 is low. The less efficient high stage is available to deal with the higher load, or when the weather is hotter. For example, in the low stage, compressor 110 can have a single-cylinder configuration, and in the high stage it can have a dual-cylinder configuration, which allows for higher flow rates of refrigerant. Controller 150 is configured to determine whether system 100 operates in low or high stage cooling.

The system 100 of the present disclosure eliminates extra complexity in components and wiring when controlling multistage cooling equipment, by intelligent integration of all sensing and control functions into the controller 150. This allows the system 100 to operate using the normal factory installed devices.

A control thermostat 190 located within the environment to be cooled measures the temperature within that environment, and communicates a need for cooling to the controller 150. As previously discussed, system 100 uses controller 150 to monitor the OCT sensor 170, the OAT sensor 160, the LPS 180, control thermostat 190, and other inputs to control the operation of the compressor 110 and ODF 125. The control thermostat 190 is configured so that when the temperature in the environment to be cooled rises above a desired temperature or a desired temperature range, control thermostat 190 sends a signal to controller 150 that indicates a need for cooling. This signal is used to turn compressor 110 and ODF 125 on, which begins the cooling cycle. When control thermostat 190 senses that the temperature in the environment to be cooled has reached the desired temperature or is within the desired temperature range, it can send a signal to controller 150 indicating as such, and compressor 110 and ODF 125 are turned off. Control thermostat 190 can also send a signal to controller 150 to enter low ambient cooling mode.

Controller 150, via algorithm 155, cycles ODF 125 on and off substantially simultaneously with the cycling of the compressor 110 on and off during periods of normal cooling operation. For purposes of this disclosure, "normal cooling operation" is defined as that which is performed when the ambient temperature is above a set temperature value. In one embodiment, the set temperature value can be about 55 degrees Fahrenheit (° F.). Of course, it is contemplated by the present disclosure for controller 150 to control system 100 to enter normal cooling operation or low ambient cooling operation at any temperature desired by the user.

Conversely, and for purposes of this disclosure, "low ambient cooling" is defined as a cooling operation when the outdoor air temperature is below the set temperature value. In low ambient cooling operation, controller 150 controls the operation of system 100 by cycling ODF 125 while compressor 110 continues to run so as to ensure that a liquid refrigerant supply to the expansion valve 130 is maintained. The controller 150 monitors the OCT sensor 170 and the OAT sensor 160 for a temperature difference indicating that ODF 125 should be cycled on or off, as described in the following ODF cycling routine, which is a subset of algorithm 155.

At the beginning of every cooling cycle, algorithm 155 keeps ODF 125 on for a first period of time, $t_1$. Algorithm 155 then turns off ODF 125 if OCT<OAT+$X_1$, ODF 125 is left on if OCT>OAT+$X_2$, or OCT>$T_3$. Through use of a timer in controller 150, algorithm 155 does not turn ODF 125 on or off for more than a second period of time, $t_2$, when system 100 is in low ambient cooling mode. As used herein, $X_1$, $X_2$, and $T_3$ are temperature constants, and $t_1$ and $t_2$ are time constants, that are used in the algorithm 155. In one embodiment, the constants are as follows: $X_1$=about 3° F., for dual stage high stage or single stage operation, $X_1$=about 1° F. for dual stage low stage operation, $X_2$=about 25° F., $T_3$=about 80° F., $t_1$=about 3 minutes, and $t_2$=about 30 minutes. The present disclosure, however, contemplates the use of other temperature constants $X_1$, $X_2$, and $T_3$, and time constants $t_1$ and $t_2$, in algorithm 155, where the values of the temperature and time constants depend on the particular parameters of the environment and system in which they are used.

Algorithm 155 thus uses the temperature values and measurements described above to prevent refrigerant floodback and compressor thermal protector trips. Compressor 110 is protected internally by a thermal trip unit (not shown) that is sensitive to the temperature of compressor 110 and the amount of current that is supplied to it. When the current and/or temperature parameters exceed desired values, indicating an undesirably high workload on compressor 110, the thermal trip unit cuts the power supply to compressor 110. The thermal trip unit protects compressor 110 from thermal damage, but is not intended to be used as a way to cycle the compressor power on and off during cooling operation. Advantageously, algorithm 155 prevents thermal conditions that can lead to the thermal trip unit being activated. Algorithm 155 also optimizes the performance (cooling capacity and efficiency) for single and multistage systems at low ambient temperatures. Algorithm 155 also limits the cycling of the ODF 125 to only what is needed to accomplish the intended work, thereby improving the reliability through exposing the ODF to fewer cycles than previously possible.

As previously stated, algorithm 155 turns on ODF 125 for the first period of time $t_1$, which allows the refrigerant within system 100 to stabilize. To ensure that system 100 is not shut down due to false indications of low system refrigerant charge from LPS 180, controller 150 uses the following LPS bypass routine, which is a subset of algorithm 155.

At the beginning of the cooling cycle, system 100 starts compressor 110, even if LPS 180 is indicating that a low system refrigerant charge condition exists, and ignores LPS 180 for the first period of time $t_1$ (e.g., the first three minutes of the cooling cycle). LPS 180 is ignored during the first period of time $t_1$ to allow system 100 sufficient time to recover to a normal refrigerant pressure.

After the first period of time $t_1$, if LPS 180 indicates that a low system refrigerant charge condition exists, then algorithm 155 controls system 100 to turn the ODF 125 off, and keeps it off for up to a third period of time $t_3$, with compressor 110 running. In one embodiment, $t_3$ is about ten minutes.

The refrigerant pressure rises with ODF 125 off, and this could bring the refrigerant pressure to normal operating levels, such that LPS 180 no longer indicates that the low system refrigerant charge condition exists. If the LPS 180 indicates that the low system refrigerant charge condition no longer exists within the third period of time $t_3$, then algorithm 155 controls system 100 to continue cooling with the ODF 125 off, follows the ODF cycling routine discussed above, and ignores LPS 180 for the remainder of the cooling cycle.

If LPS 180 still indicates that the low system refrigerant charge condition exists within the third period of time $t_3$, system 100 follows the normal LPS response, namely to shut down cooling operation by shutting down compressor 110 and generating an LPS fault signal. The LPS fault signal is a fault that requires the system 100 to be serviced.

Figure 2:
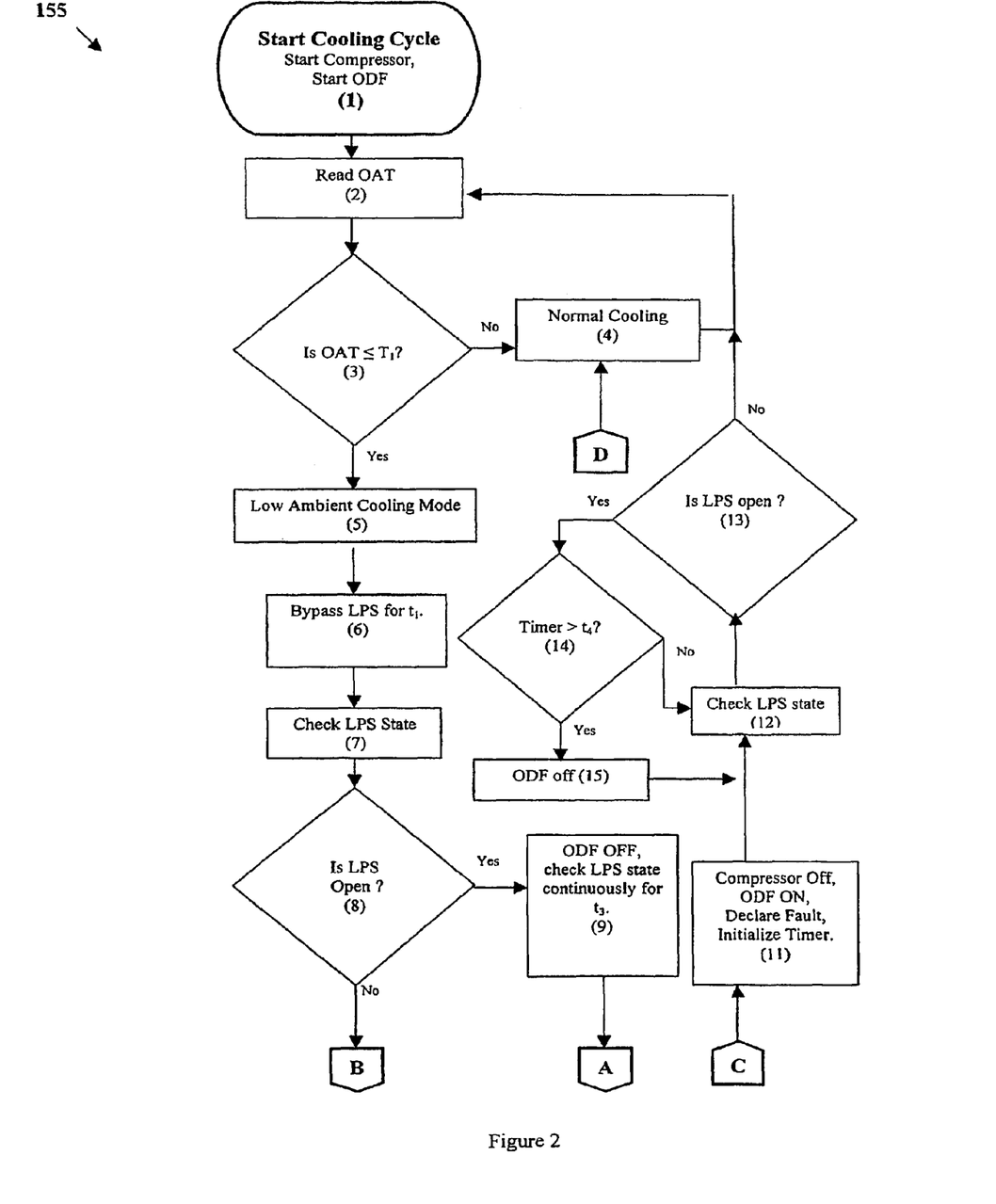
FIG. 2 is a first section of a logic diagram of an algorithm embedded in a controller of the air conditioning system of FIG. 1.
Figure 3:
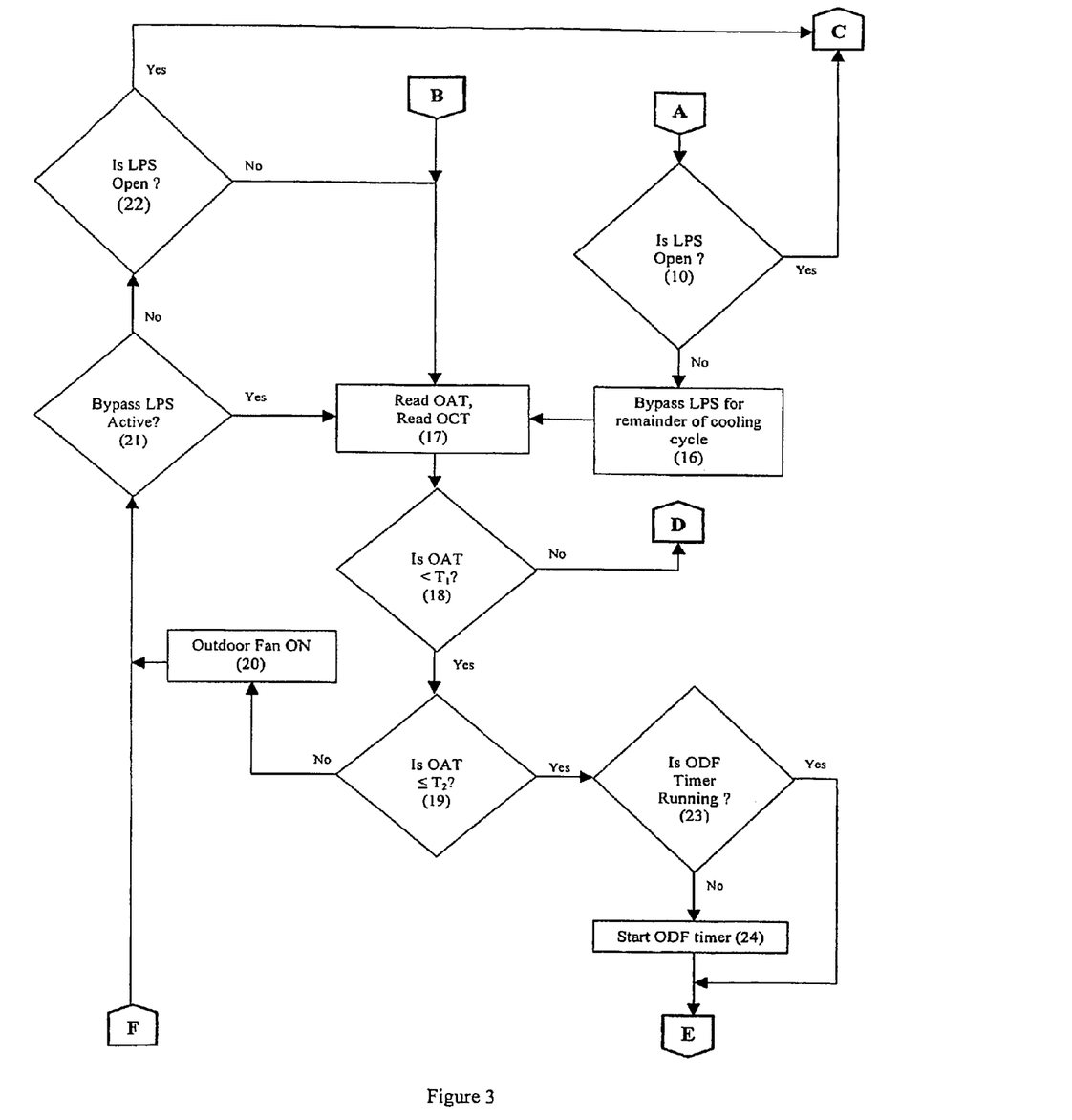
FIG. 3 is a second section of the logic diagram of FIG. 2.
Figure 4:
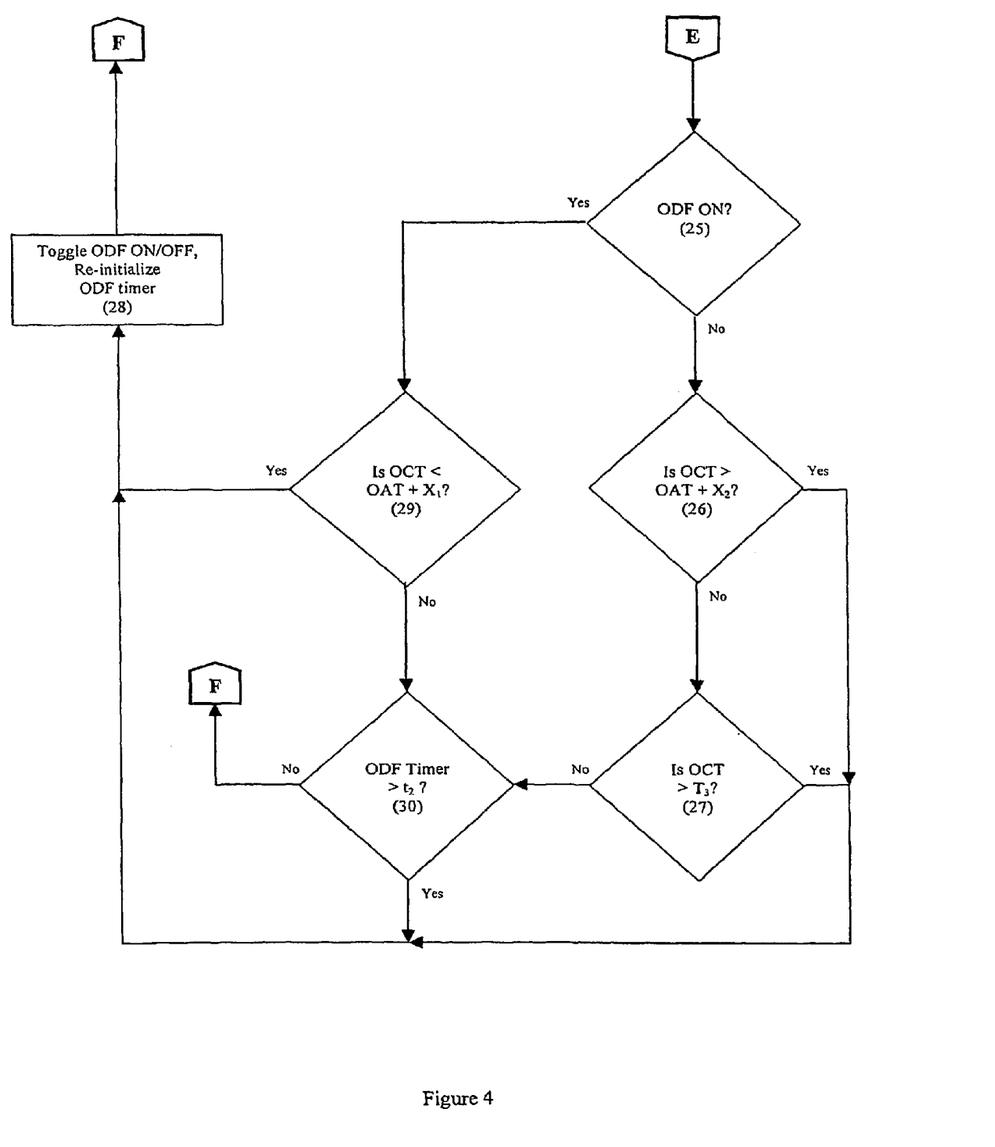
FIG. 4 is a third section of the logic diagram of FIG. 2.

Referring to FIGS. 2-4, a flow chart illustrating the algorithm 155 discussed above, which is imbedded in controller 150 of the system 100, is shown.

At the beginning of the cooling cycle (step 1), algorithm 155 reads the OAT sensor 160 (2). Algorithm 155 makes a determination whether the OAT as measured by OAT sensor 160 is above or below a set temperature value, namely the first temperature $T_1$ (3).

If the OAT is greater than the first temperature $T_1$, algorithm 155 controls system 100 to enter normal cooling operation (4). If the OAT is below the first temperature $T_1$, algorithm 155 controls system 100 to enter low ambient cooling mode (5). In low ambient cooling mode, controller 150 starts the compressor 110 and the ODF 125, and bypasses LPS 180 for the first period of time $t_1$ (6). After this first period of time $t_1$, the controller 150 checks the state of LPS 180 (7), and determines whether it is open or closed, i.e. activated or deactivated (8).

If LPS 180 is closed, algorithm 155 goes to step (17), discussed below. If LPS 180 is open, the algorithm 155 controls controller 150 to turn ODF 125 off, and checks the state of LPS 180 for the third period of time $t_3$. The algorithm 155 continues to check if LPS 180 is open while ODF 125 is off (10).

If LPS 180 remains open through the third period of time $t_3$ ((9)-(10)), algorithm 155 causes controller 150 to turn compressor 110 off, ODF 125 on, declares a system fault, and initializes a timer (11). Algorithm 155 then checks LPS 180 again (12), and determines if LPS 180 is open or closed (13). If LPS 180 is closed, controller 150 starts the cooling cycle again and checks the OAT sensor 160, as discussed above (2). If LPS 180 is open at step (13), however, the algorithm 155 determines if the timer initialized at step (11) has reached a fourth period of time $t_4$ (14). In one embodiment, $t_4$ can be 15 minutes. If the timer reads less than $t_4$ algorithm 155 resumes with step (12) discussed above. If the timer reads more than $t_4$, however, the algorithm 155 causes controller 150 to turn ODF 125 off (15) before resuming with step (12). The use of this time initialized in step (11) allows ODF 125 to help with the recovery of the system parameters that have lead to a compressor shut down once LPS 180 has signaled an accurate system fault. ODF 125 is run for the time $t^4$ in an effort to help system 100 recover. If system 100 does not recover in this time U, algorithm 155 continues to monitor LPS 180 with the fan off until system 100 recovers on its own, or is serviced. If system 100 does recover, algorithm 155 returns system 100 to step (2), discussed above.

Returning to step (10), if LPS 180 is closed, the algorithm 155 bypasses LPS 180 for the remainder of the cooling cycle (16), reads OAT sensor 160 and OCT sensor 170 again (17), and determines whether the OAT is less than the first temperature $T_1$ (18). If the OAT is not less than the first temperature $T_1$ (18), then algorithm 155 controls system 100 to resume normal cooling operation (4). If the OAT is less than the first temperature $T_1$, the algorithm 155 determines whether the OAT is also less than a second temperature $T_2$ (19). In one embodiment, second temperature $T_2$ can be about 38° F. If the OAT is greater than second temperature $T_2$, algorithm 155 controls controller 150 to turn ODF 125 on (20), and in step (21) then checks to see whether the LPS is currently being bypassed, as discussed in step (16). If the LPS is being bypassed, algorithm 155 proceeds with step (17) as discussed above. If the LPS is not being bypassed, then algorithm 155 determines whether LPS 180 is open (22). If LPS 180 is not open, algorithm 155 again proceeds with step (17). If LPS 180 is open, the algorithm 155 proceeds with step (11), discussed above. The present disclosure has discovered that the efficiency of system 100 can be increased by making the second comparison of the OAT to the value $T_2$. The cycling of ODF 125 can be decreased if the OAT is less than $T_1$ but still greater than $T_2$. Thus, algorithm 155 essentially bypasses the ODF cycling routine of algorithm 155 when the OAT is between $T_1$ and $T_2$. This limits the overall amount of cycling of, and further reduces the wear and tear on, ODF 125.

Returning to step (19), if algorithm 155 determines that the OAT is less than the second temperature $T_2$, the algorithm 155 checks to see if an ODF timer is running (23). If the ODF timer is not running, the algorithm 155 starts the ODF timer (24), and then checks to see if ODF 125 is on (25). If the ODF timer is already running, the algorithm 155 goes directly from step (23) to step (25).

If ODF 125 is off (25), the algorithm 155 checks to see if the OCT is greater than the sum of the OAT and constant $X_2$ (26). If the OCT is greater than the sum of the OAT and constant $X_2$, the algorithm 155 turns ODF 125 on, re-initializes the ODF timer (28), and then proceeds with step (21) discussed above.

If the OCT is not greater than this value, algorithm 155 checks to see if it is greater than a temperature $T_3$ (27). If the OCT is greater than or equal to $T_3$, algorithm 155 proceeds to step (28), discussed above; if the OCT is less than $T_3$, the algorithm 155 checks to see whether the timer in step (23) has reached the second period of time $t_2$. If this timer has reached $t_2$, algorithm 155 proceeds to step (28). If the timer is less than $t_2$, algorithm 155 proceeds to step (21). Thus, through the use of the ODF timer, algorithm 155 prevents ODF 125 from cycling too frequently. This prevents undesirable harmonics within the system 100, and unnecessary wear on the system components.

Returning to step (25), if algorithm 155 determines whether ODF 125 is on, the algorithm 155 then determines whether the OCT is less than the sum of the OAT and the constant $X_1$ (29). If the OCT is less than the sum of the OAT and $X_1$, algorithm 155 turns ODF 125 off, re-initializes the ODF timer (28), and then proceeds with step (21) discussed above.

If the OCT is not less than the sum of the OAT and $X_1$, algorithm 155 checks to see whether the timer initialized in step (23) has reached the second period of time $t_2$ (30). If this timer has reached $t_2$, algorithm 155 proceeds to step (28). If the timer is less than $t_2$, algorithm 155 proceeds to step (21). Again, through the use of the ODF timer, algorithm 155 prevents ODF 125 from cycling too frequently, which prevents undesirable harmonics within the system 100 and unnecessary wear on the system components.

The system 100 of the present disclosure can also be used in conjunction with other system controls to implement indoor coil freeze protection. These devices are further described in a co-pending U.S. patent application Ser. No. 11/646,674, entitled "Method to Detect and Respond to a Freezing Indoor Coil of an HVAC System," and filed Dec. 28, 2006, which is incorporated by reference herein in its entirety.

The above description fully discloses the disclosure including exemplary embodiments thereof. Modifications and improvements of the embodiments specifically disclosed herein are within the scope of the following claims. Without further elaboration, it is believed that one skilled in the area can, using the preceding description, utilize the present disclosure to its fullest extent. Therefore, the examples herein are to be construed as merely illustrative and not a limitation of the scope of the present disclosure in any way. The embodiments of the disclosure in which an exclusive property or privilege is claimed are defined as follows.

What is claimed is:

1. An air conditioning system comprising:
    a first temperature sensor, wherein said first temperature sensor measures a temperature of ambient air outside said air conditioning system; and
    a controller, wherein said first temperature sensor is in electrical communication with said controller, wherein an algorithm resident on said controller controls said controller to enter a low ambient cooling mode when said temperature of ambient air is less than a first temperature;
    a compressor;
    a condenser coil;
    wherein said condenser coil is in fluid communication with said compressor;
    a condenser fan, wherein said condenser fan blows air over said condenser coil;
    a second temperature sensor, wherein said second temperature sensor is in electric communication with said controller, and measures a temperature of said condenser coil, wherein when said controller is in said low ambient cooling mode, said algorithm controls said controller so that:
    said outdoor fan is on if said compressor is on, when said temperature of ambient air is greater than a third temperature and less than said first temperature;
    said compressor and said condenser fan are on for a first amount of time when said temperature of ambient air is less than said third temperature;
    said condenser fan is turned off after said first amount of time elapses, if said temperature of said condenser coil is less than a sum of said temperature of ambient air and a first offset value, or if said condenser fan has been on for more than a second amount of time;
    said condenser fan is turned back on, if said condenser coil temperature is greater than the sum of said ambient air temperature and a second offset value, or if said condenser temperature is greater than a fourth temperature, or if said condenser fan has been off for more than said second amount of time.

2. The air conditioning system of claim 1, further comprising:
    a thermostat, wherein said thermostat is disposed within an environment to be cooled by said air conditioning system, and measures a second temperature within said environment, and
    wherein said compressor, said condenser fan, and said thermostat are in electrical communication with said controller, and
    wherein when said second temperature is above a desired temperature range for said environment, said thermostat sends a signal to said controller to turn on said compressor and said condenser fan, and when said second temperature is within said desired temperature range, said thermostat sends a signal to said controller to turn said compressor and said condenser fan off.

3. The air conditioning system of claim 2, wherein said thermostat controls said controller to enter said low ambient cooling mode.

4. The air conditioning system of claim 1, further comprising:
    a low pressure switch, wherein said low pressure switch is in electrical communication with said controller and measures a pressure of a refrigerant disposed within said air conditioning system, and sends a fault signal to said controller if said pressure of said refrigerant falls below a desired value; and
    wherein said algorithm further controls said controller so that:
    said low pressure switch is ignored by said controller for said first amount of time;
    said condenser fan is turned off after said first amount of time elapses, if said low pressure switch sends said fault signal;
    said low pressure switch is continuously checked for a third amount of time;
    if said low pressure switch no longer sends said fault signal during said third amount of time, said low pressure switch is ignored until said second temperature is within said desired temperature range; and
    if said low pressure switch sends said fault signal at the end of said third amount of time, said compressor is turned off.

5. The air conditioning system of claim 4, wherein:
    said first temperature is 55° F.;
    said third temperature is 38° F.;
    said fourth temperature is 80° F.;
    said first offset value is 3° F.;
    said second offset value is 25° F.;
    said first amount of time is three minutes;
    said second amount of time is thirty minutes; and
    said third amount of time is ten minutes.

6. The air conditioning system of claim 4, wherein said air conditioning system is a dual stage air conditioning system.

7. The air conditioning system of claim 6, wherein:
    said first temperature is 55° F.;
    said second temperature is 38° F.;
    said third temperature is 80° F.;
    said first temperature offset value is 3° F. when said air conditioning system is in high stage cooling operation, and 1° F. when said air conditioning system is in low stage cooling operation;
    said second temperature offset value is 25° F.;
    said first amount of time is three minutes;
    said second amount of time is thirty minutes, and
    said third amount of time is ten minutes.

8. An air conditioning system comprising:
    a refrigeration circuit having a compressor and a condenser fan;
    a first temperature sensor that measures an ambient outside air temperature;
    a controller in electrical communication with said compressor, said condenser fan, and said first temperature sensor; and
    an algorithm resident on said controller, said algorithm operating said refrigeration circuit in a low ambient cooling mode when said ambient air temperature is less than a set temperature, said algorithm, upon initiation of said low ambient cooling mode, operates said condenser fan for a first predetermined period of time
    a second temperature sensor that measures a condenser coil temperature, wherein said second temperature sensor is in electrical communication with said controller, wherein said algorithm, when in said low ambient cooling mode, is configured to turn said condenser fan off after said first redetermined period of time, if said condenser coil temperature is less than a first sum of said ambient outside air temperature and a first temperature offset value.

9. The air conditioning system of claim 8, wherein said set temperature is about 55° F.

10. The air conditioning system of claim 8, wherein said first predetermined period of time is about three minutes.

11. The air conditioning system of claim 8, wherein said algorithm, when in said low ambient cooling mode, is configured to turn said condenser fan off after said first predetermined period of time if said condenser fan has been on for more than a second predetermined period of time.

12. The air conditioning system of claim 11, wherein said second predetermined period of time is about thirty minutes.

13. The air conditioning system of claim 8, wherein said first temperature offset value is about 3° F.

14. The air conditioning system of claim 8, wherein said first temperature offset value is about 3° F. when said controller operates said refrigeration circuit to perform a high stage cooling operation, and about 1° F. when said controller operates said refrigeration circuit to perform a low stage cooling operation.

15. The air conditioning system of claim 8, wherein said algorithm, when in said low ambient cooling mode, is configured to operate said condenser fan, if said condenser fan has been off for more than a second predetermined period of time.

16. The air conditioning system of claim 15, wherein said second predetermined time period is thirty minutes.

17. An air conditioning system comprising:
- a refrigeration circuit having a compressor and a condenser fan;
- a first temperature sensor that measures an ambient outside air temperature;
- a controller in electrical communication with said compressor, said condenser fan, and said first temperature sensor; and
- an algorithm resident on said controller, said algorithm operating said refrigeration circuit in a low ambient cooling mode when said ambient air temperature is less than a set temperature, said algorithm, upon initiation of said low ambient cooling mode, operates said condenser fan for a first predetermined period of time;
- wherein said algorithm, when in said low ambient cooling mode, is further configured to operate said condenser fan after said first predetermined period of time, if said condenser coil temperature is greater than a second sum of said ambient outside air temperature and a second temperature offset value, or if said condenser coil temperature is greater than a third offset temperature value.

18. The air conditioning system of claim 17, wherein said second temperature offset value is about 25° F. and said third temperature offset value is about 80° F.

19. An air conditioning system comprising:
- a refrigeration circuit having a compressor and a condenser fan;
- a pressure sensor that measures a refrigerant pressure within said refrigeration circuit;
- a first temperature sensor that measures an ambient outside air temperature;
- a controller in electrical communication with said compressor, said condenser fan, said pressure sensor, and said first temperature sensor; and
- an algorithm resident on said controller, said algorithm operating said refrigeration circuit in a low ambient cooling mode when said ambient air temperature is less than a set temperature, and said algorithm, upon initiation of said low ambient cooling mode, operating said condenser fan for a first period of time regardless of said refrigerant pressure, and shuts said condenser fan off for a second period of time, if said refrigerant pressure falls below a desired level.

* * * * *